United States Patent
Katano

(10) Patent No.: US 8,524,407 B2
(45) Date of Patent: Sep. 3, 2013

(54) GAS SUPPLY DEVICE

(75) Inventor: Koji Katano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/521,944

(22) PCT Filed: Jan. 15, 2010

(86) PCT No.: PCT/JP2010/000206
§ 371 (c)(1),
(2), (4) Date: Jul. 12, 2012

(87) PCT Pub. No.: WO2011/086603
PCT Pub. Date: Jul. 21, 2011

(65) Prior Publication Data
US 2013/0040218 A1  Feb. 14, 2013

(51) Int. Cl.
*H01M 8/04* (2006.01)

(52) U.S. Cl.
USPC .......................................................... 429/429

(58) Field of Classification Search
None
See application file for complete search history.

(56) References Cited

U.S. PATENT DOCUMENTS

| | | | | |
|---|---|---|---|---|
| 6,920,761 B2* | 7/2005 | Laper | ............................... | 60/772 |
| 2005/0037250 A1* | 2/2005 | Gunther | ........................... | 429/26 |
| 2005/0118475 A1* | 6/2005 | Ueda et al. | ....................... | 429/26 |
| 2005/0266284 A1* | 12/2005 | Scharf | ............................... | 429/25 |
| 2008/0138689 A1* | 6/2008 | Leo et al. | ......................... | 429/34 |
| 2008/0145715 A1* | 6/2008 | Lienkamp et al. | .............. | 429/13 |
| 2009/0155641 A1* | 6/2009 | Senner et al. | .................... | 429/17 |

FOREIGN PATENT DOCUMENTS

| | | |
|---|---|---|
| JP | 56-114287 A | 9/1981 |
| JP | 07-235324 A | 9/1995 |
| JP | 2002-231277 A | 8/2002 |
| JP | 2002-246045 A | 8/2002 |
| JP | 2005-302563 A | 10/2005 |
| JP | 2005-302571 A | 10/2005 |
| JP | 2007-317597 A | 12/2007 |
| JP | 2008-071669 A | 3/2008 |
| JP | 2009-146675 A | 7/2009 |

OTHER PUBLICATIONS

International Search Report issued Apr. 20, 2010 in PCT/JP2010/000206.

* cited by examiner

*Primary Examiner* — Patrick Ryan
*Assistant Examiner* — Jose Colucci Rios
(74) *Attorney, Agent, or Firm* — Kenyon & Kenyon LLP

(57) ABSTRACT

A gas supply device for use in a fuel cell system, comprises: a first injector configured to have a first maximum valve-openable pressure; a second injector arranged in parallel with the first injector and configured to have a lower flow rate than the first injector and a greater second maximum valve-openable pressure than the first maximum valve-openable pressure; a first pressure sensor located upstream of the first and second injectors; and a controller configured to control open/close operation of the first and second injectors, wherein at a start of the fuel cell system, (i) when pressure in the upstream of the first and second injectors is greater than the first maximum valve-openable pressure but is less than or equal to the second maximum valve-openable pressure, the controller opens the second injector, and (ii) when the pressure in the upstream of the first and second injectors is less than or equal to the first maximum valve-openable pressure, the controller opens the first injector or the second injector.

6 Claims, 9 Drawing Sheets

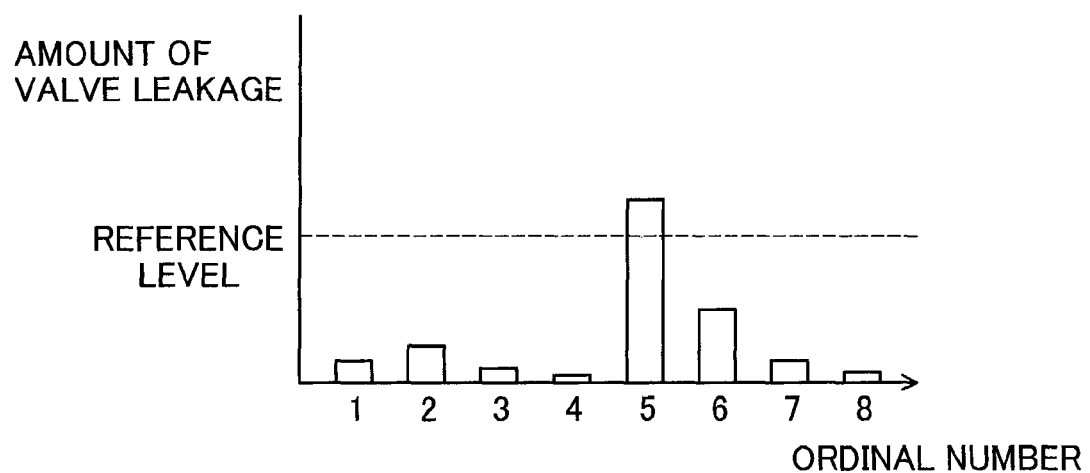

DISTANCE FROM END 110a OF GAS FLOW PATH 110

GAS SUPPLY DEVICE

This is a 371 national phase application of PCT/JP2010/000206 filed 15 Jan. 2010, the contents of which are incorporated herein by reference.

FIELD OF THE INVENTION

The present invention relates to a gas supply device used for a fuel cell system.

BACKGROUND OF THE INVENTION

In one known structure of a gas supply device for a fuel cell system, two injectors having different flow rates are arranged in parallel with each other to regulate the amounts of gas going through the respective injectors (for example, PTL1). In general, the large injector has the large stroke and the high flow rate of the gas but cannot be opened even at the relatively low upstream pressure. The small injector, on the other hand, has the small stroke and the low flow rate of the gas and can be opened even at the relatively high upstream pressure.

CITATION LIST

Patent Literature

[PTL1] JP2005-302571 A

SUMMARY OF INVENTION

Technical Problem

When an injector is provided in a fuel gas supply flow path of the fuel cell system, the fuel gas flows, for example, from a fuel tank through a regulator, the injector, and a fuel cell stack in this sequence. When the fuel cell system is kept stopped for a long period of time, the fuel gas leaks through the regulator from the upstream side to the downstream side, and the leaked gas may be accumulated between the regulator and the injector, thereby increasing the pressure in the gas flow path between the regulator and the injector. The increasing pressure may undesirably interfere with valve-opening of the large injector at a restart of the fuel cell system. Frequent valve-opening of the small injector may, on the other hand, undesirably reduce the durability of the small injector. The small injector has the low gas flow rate and is thus required to be kept open for a long period of time, in order to decrease the pressure in the gas flow path between the regulator and the injector. This may undesirably increase the power consumption used for driving the injector. The low flow rate of the gas supply may cause a variation in gas concentration in the fuel cell stack, thereby undesirably forming a concentration cell and degrade a catalyst used in the fuel cell stack.

Consequently, in order to solve at least part of the foregoing, an object of the present invention is to provide energy saving and the improved durability of a fuel cell system.

Solution to Problem

[Aspect 1]
A gas supply device for use in a fuel cell system, comprising: a first injector configured to have a first maximum valve-openable pressure; a second injector arranged in parallel with the first injector and configured to have a lower flow rate than the first injector and a greater second maximum valve-openable pressure than the first maximum valve-openable pressure; a first pressure sensor located upstream of the first and second injectors; and a controller configured to control open/close operation of the first and second injectors, wherein at a start of the fuel cell system, (i) when pressure in the upstream of the first and second injectors is greater than the first maximum valve-openable pressure but is less than or equal to the second maximum valve-openable pressure, the controller opens the second injector, and (ii) when the pressure in the upstream of the first and second injectors is less than or equal to the first maximum valve-openable pressure, the controller opens the first injector or the second injector.

When the upstream pressure is greater than the maximum valve-openable pressure of the first injector, the gas supply device of this aspect first opens the second injector to reduce the upstream pressure, and subsequently opens the first injector. When the upstream pressure is not greater than the maximum valve-openable pressure of the first injector, on the other hand, the gas supply device opens either the first injector or the second injector. This reduces the frequency of operation of the second injector, thus improving the durability of the second injector and the fuel cell system.

[Aspect 2]
The gas supply device according to aspect 1, wherein when the pressure in the upstream of the first and second injectors is dropped to or below the first maximum valve-openable pressure after the opening of the second injector, the controller opens the first injector.

The gas supply device of this aspect opens the first injector to supply a gas. This increases the flow rate and decreases the hydrogen distribution in the fuel cell, thus preventing formation of a concentration cell.

[Aspect 3]
The gas supply device according to aspect 2, wherein the controller closes the second injector after the opening of the first injector.

The gas supply device of this aspect reduces the energy consumption for valve-opening of the second injector, thus achieving energy saving.

[Aspect 4]
The gas supply device according to any one of aspects 1 to 3, wherein the second injector has: a valve seat; and a metal valve element.

In the gas supply device of this aspect, the second injector has the metal valve element. This shortens the stroke for the flow of the gas and achieves energy saving.

[Aspect 5]
The gas supply device according to aspect 4, further comprising: a second pressure sensor located downstream of the first and second injectors, wherein after stop of operation of the fuel cell system, when a decrease rate of the pressure in the downstream of the first and second injectors is lower than a predetermined reference level, the controller opens the second injector and subsequently closes the second injector.

The gas supply device of this aspect detects a leakage of the injector and reduces the amount of gas leakage by the subsequent open/close operation of the injector.

[Aspect 6]
The gas supply device according to any one of aspects 1 to 5, wherein, the gas supply device comprises a plurality of the first injectors, wherein when opening the second injector and subsequently opening the first injector, the controller first opens one of the first injectors that is located at a position having a shortest distance from the second injector among the plurality of first injectors.

In the gas supply device of this aspect, the upstream pressure at the position of the first injector having the shortest distance from the second injector is dropped, prior to the upstream pressure at the positions of the other first injectors. This allows valve-opening of the first injector at the earlier timing.

[Aspect 7]

The gas supply device according to aspect 6, wherein when two or more first injectors are located at positions having the shortest distance from the second injector, the controller first opens one of the two or more first injectors that is located on the most downstream side.

In the gas supply device of this aspect, the upstream pressure at the position of the first injector located on the most downstream side is dropped, prior to the upstream pressure at the positions of the other first injectors located on the upstream side. This allows valve-opening of the first injector at the earlier timing.

[Aspect 8]

The gas supply device according to aspect 7, wherein the first pressure sensor is located at such a position that a distance between the first pressure sensor and the first injector opened first is shorter between a distance between the first pressure sensor and other non-opened first injector.

The gas supply device of this aspect can readily determine the valve-open timing of the first injector.

The present invention is not limited to the gas supply device but may also be implemented by various other applications, for example, a fuel cell system and a control method of an injector for a fuel cell. The invention is not limited to the above aspects, but a multiplicity of variants and modifications may be made to these aspects without departing from the scope of the invention.

BRIEF DESCRIPTION OF DRAWINGS

FIG. 10 illustrates one example of a variation in amount of leakage by the open/close operations of the small injector.

DETAILED DESCRIPTION

Figure 1:
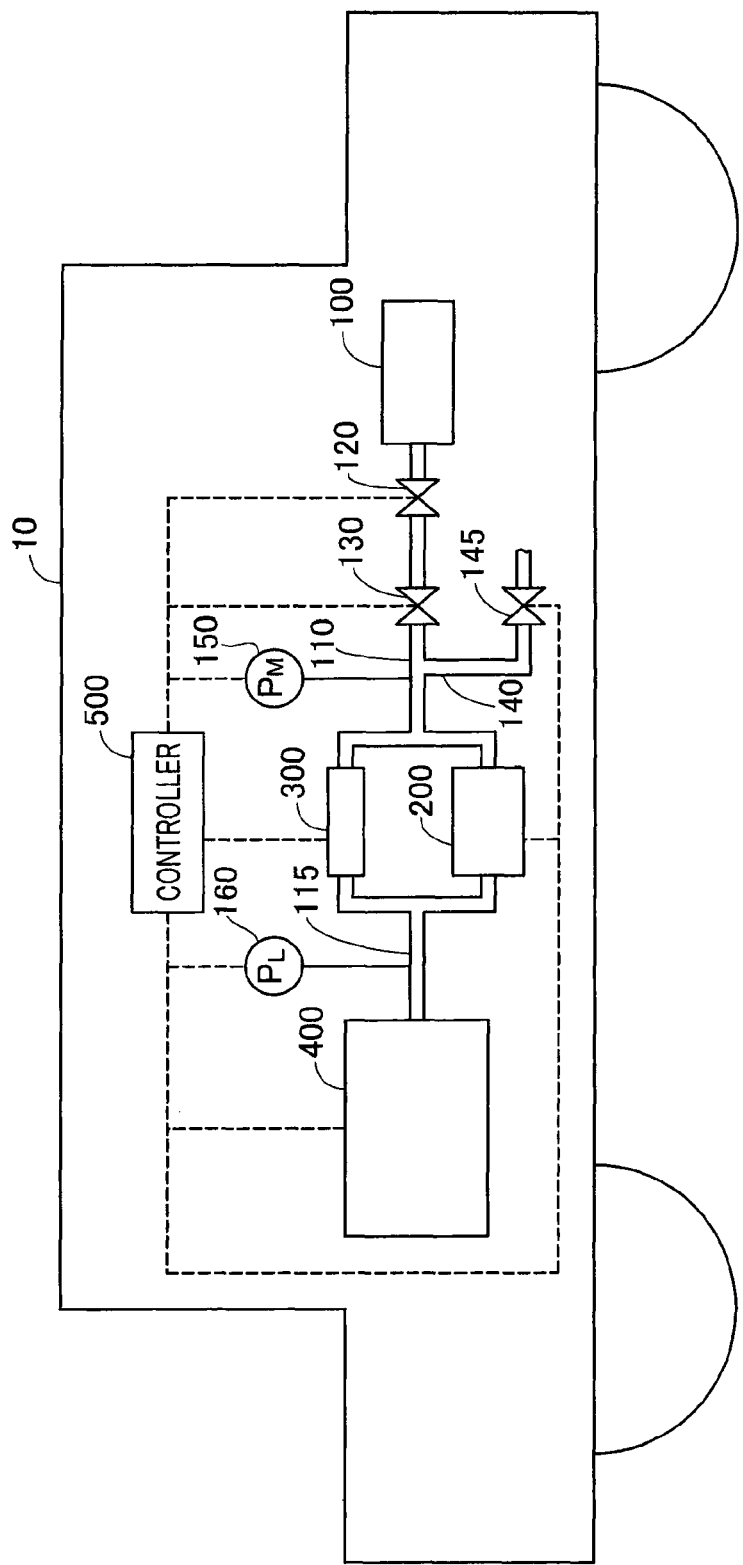
FIG. 1 illustrates a fuel cell vehicle.

FIG. 1 illustrates a fuel cell vehicle. The following describes the fuel cell vehicle 10 as the fuel cell system according to one embodiment. The fuel cell vehicle 10 includes a fuel tank 100, a large injector (first injector) 200, a small injector (second injector) 300, a fuel cell stack 400 and a controller 500. The fuel tank 100 is connected with each of the large injector 200 and the small injector 300 with an upstream gas supply pipe 110. Each of the large injector 200 and the small injector 300 is connected with the fuel cell stack 400 with a downstream gas supply pipe 115. In other words, the large injector 200 and the small injector 300 are arranged in parallel.

A main stop valve 120, a regulator 130 and an upstream pressure gauge (first pressure gauge) 150 are provided in the upstream gas supply pipe 110. The main stop valve 120 is operated to control whether a fuel gas (hydrogen) is to be supplied from the fuel tank 100. The regulator 130 is operated to adjust the supply pressure (or the supply amount) of the fuel gas. A branch pipe 140 is branched off from the upstream gas supply pipe 110, and a relief valve 145 is provided in the branch pipe 140. When the pressure in the upstream gas supply pipe 110 rises to a preset upper pressure limit Plimit, the relief valve 145 is opened to release the fuel gas in the upstream gas supply pipe 110 to the atmosphere and thereby decrease the pressure in the upstream gas supply pipe 110. At the start of the fuel cell vehicle 10, when the pressure in the upstream gas supply pipe 110 is greater than a maximum valve-openable pressure (this is the pressure upper limit over which the injector cannot be opened) of the small injector 300, the relief valve 145 is opened by a signal output from the controller 500 to release the fuel gas in the upstream gas supply pipe 110 to the atmosphere and thereby decrease the pressure in the upstream gas supply pipe 110. A downstream pressure gauge (second pressure gauge) 160 is provided in the downstream gas supply pipe 115.

Figure 2A:
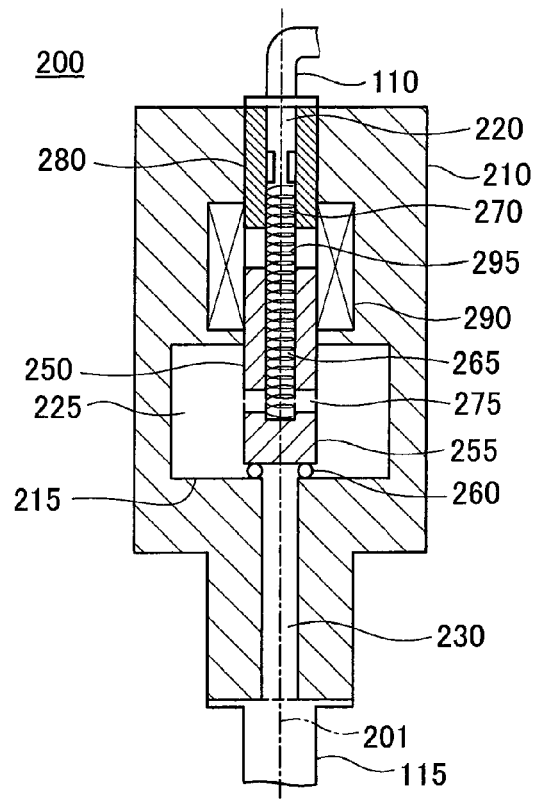
FIGS. 2A and 2B schematically illustrate the cross section of the large injector.
Figure 2B:
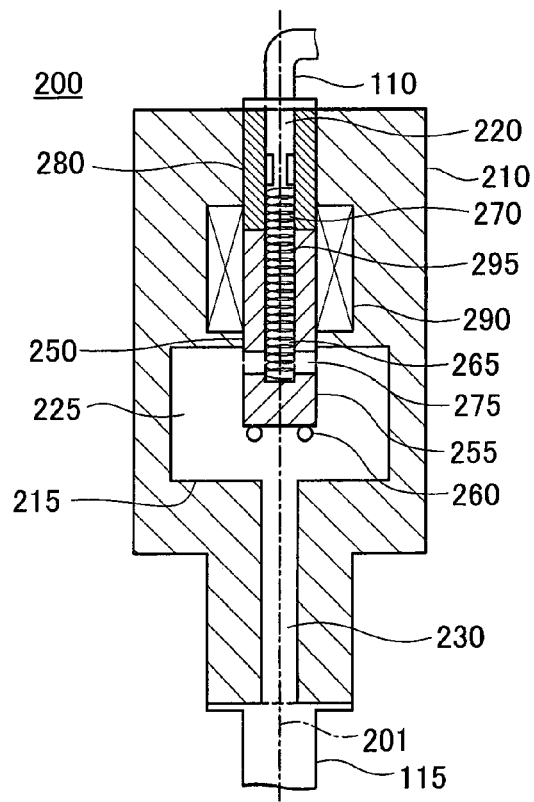

FIGS. 2A and 2B schematically illustrate the cross section of the large injector. FIG. 2A shows the large injector 200 in the closed position, and FIG. 2B shows the large injector 200 in the open position. The large injector 200 includes an outer cylinder 210, a plunger 250 and a stationary iron core 280. The outer cylinder 210 has the hollow structure to accommodate the plunger 250 and the stationary iron core 280 therein. The fuel gas supplied from the upstream gas supply pipe 110 flows through a first gas flow path 220, a second gas flow path 270, a third gas flow path 265, a fourth gas flow path 275, a fifth gas flow path 225 and a sixth gas flow path 230 in this sequence to the downstream gas supply pipe 115.

The outer cylinder 210 is in a hollow columnar shape and has the fifth gas flow path 225 and the sixth gas flow path 230. The sixth gas flow path 230 is formed along a central axis 201 of the large injector 200 and is connected with the downstream gas supply pipe 115. The fifth gas flow path 225 is formed along the central axis 201 of the large injector to have a larger inner diameter than that of the sixth gas flow path 230. A valve seat 215 is provided on a step portion between the fifth gas flow path 225 and the sixth gas flow path 230.

The upstream gas supply pipe 110 is connected to the upstream side of the stationary iron core 280. The stationary iron core 280 has the first gas flow path 220 and the second gas flow path 270. The second gas flow path 220 is formed to pass through the central axis 201 of the large injector 200. The first gas flow path 220 connects the upstream gas supply pipe 110 with the second gas flow path 270.

The plunger 250 is located in the downstream of the stationary iron core 280. The plunger 250 has a valve element 255 provided on the opposite side to the stationary iron core 280. The plunger 250 has the third gas flow path 265 and the fourth gas flow path 275. The plunger 250 has a hollow section on the stationary iron core 280-side from the valve element 255, and this hollow section serves as the third gas flow path 265. The third gas flow path 265 communicates with the second gas flow path 270. The inner diameter of the third gas flow path 265 is smaller than the inner diameter of the sixth gas flow path 230 formed in the outer cylinder 210.

The fourth gas flow path 275 is formed to pass through the side face of the plunger 250 from the downstream side of the third gas flow path 265 toward outside of the plunger 250. The valve element 255 is in an almost cylindrical shape and has a rubber sealing element 260 provided on the valve seat 215-side of the valve element 255. The fifth gas flow path 225 mentioned above is formed between the valve element 255 and the outer cylinder 210. The fifth gas flow path 225 is connected with the third gas flow path 265 by the fourth gas flow path 275.

A spring 295 is provided in the second gas flow path 270 of the stationary iron core 280 and in the third gas flow path 265 of the plunger 250. This spring 295 presses the plunger 250 away from the stationary iron core 280. The outer cylinder 210 has a solenoid 290 provided around the stationary iron core 280 and the plunger 250.

When no electric current is applied to the solenoid 290, the valve element 255 is pressed against the valve seat 215 by the pressing force of the spring 295, so as to close the large injector 200. When electric current is applied to the solenoid 290, on the other hand, the stationary iron core 280 and the plunger 250 are magnetized, so that the stationary iron core 280 attracts the plunger 250. The plunger 250 accordingly moves toward the stationary iron core 280, and the valve element 255 is separated from the valve seat 215. This causes the fuel gas to flow from the upstream gas supply pipe 110 through the first gas flow path 220, the second gas flow path 270, the third gas flow path 265, the fourth gas flow path 275, the fifth gas flow path 225 and the sixth gas flow path 230 to the downstream gas supply pipe 115.

Figure 3:
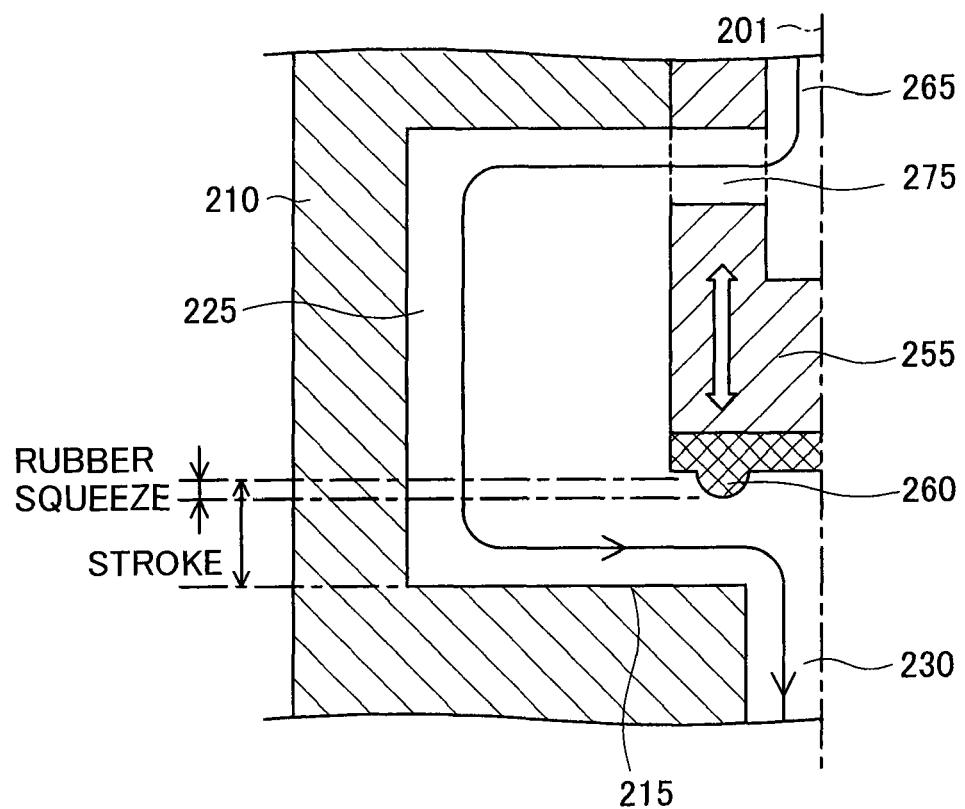
FIG. 3 is a close-up view illustrating periphery of the valve element and the valve seat of the large injector.

FIG. 3 is a close-up view illustrating periphery of the valve element and the valve seat of the large injector. In the illustrated state of FIG. 3, electric current is supplied to the solenoid 290 (FIG. 2) to separate the valve element 255 from the valve seat 215. The valve element 255 has the rubber sealing element 260 on the valve seat 215-side. The gas flows through the space between the sealing element 260 and the valve seat 215. The flow rate of the gas increases with an increase of the difference which is obtained by subtracting the compression amount (rubber squeeze) of the sealing element 260 in the valve closed position from the travel distance (stroke) of the valve element 255. When no current is supplied to the solenoid 290, the plunger 250 is pressed downward by the spring 295, so that the sealing element 260 is pressed against the valve seat 215. The large injector 200 accordingly stops the gas flow. The greater rubber squeeze reduces the possibility of leakage in the valve closed position, while the smaller rubber squeeze increases the flow rate in the valve open position.

Figure 4A:
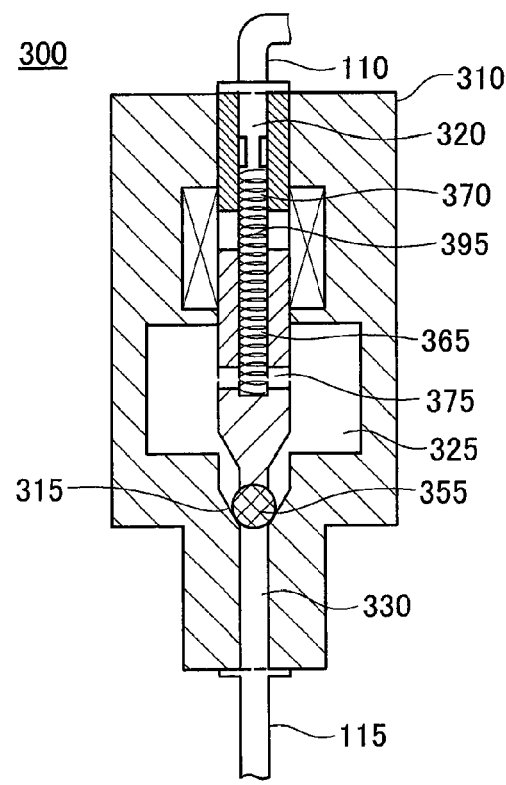
FIGS. 4A and 4B schematically illustrate the cross section of the small injector.
Figure 4B:
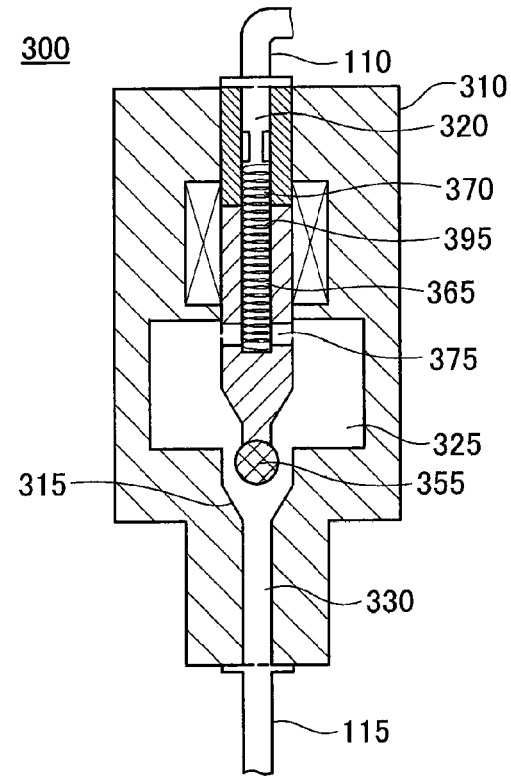
Figure 5:
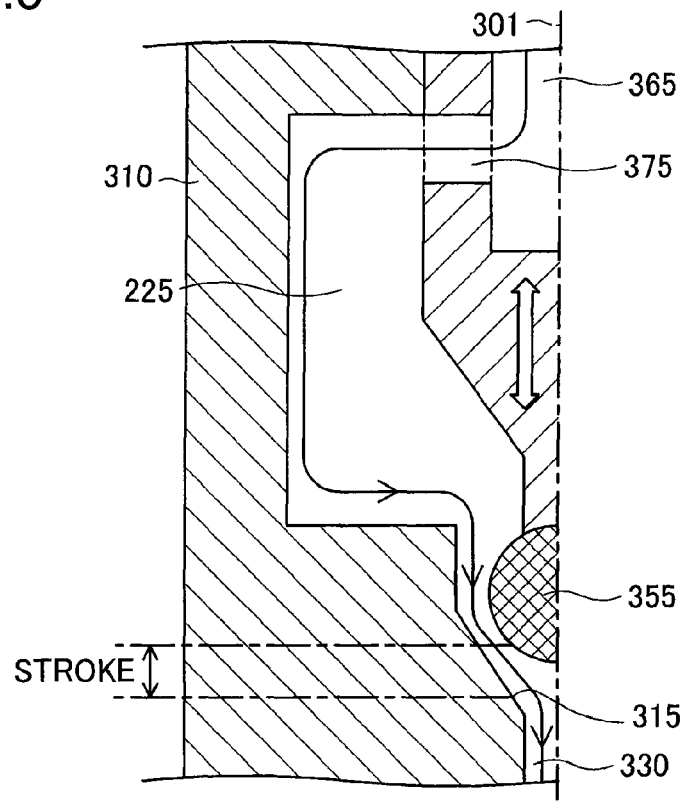
FIG. 5 is a close-up view illustrating the periphery of a valve element and a valve seat of the small injector.

FIGS. 4A and 4B schematically illustrate the cross section of the small injector. FIG. 4A shows the small injector 300 in the closed position, and FIG. 4B shows the small injector 300 in the open position. FIG. 5 is a close-up view illustrating the periphery of a valve element and a valve seat of the small injector. The structure of the small injector 300 is substantially similar to the structure of the large injector 200. The same functional elements of the small injector 300 are expressed by adding 100 to the numerical symbols assigned to the corresponding elements of the large injector. The following describes the differences of the small injector 300 from the large injector.

Whereas the valve element 255 of the large injector 200 is in the almost cylindrical shape and has the rubber sealing element 260 provided on the valve seat 215-side, a valve element 355 of the small injector 300 is in a spherical shape and is made of metal. The metal valve element 355 is not significantly deformed unlike the rubber valve element and accordingly requires the smaller stroke for the flow of fuel gas. In other words, the small injector is openable against the greater pressure difference.

The pressure-receiving area of the valve element 255 (substantially equal to the sectional area of the sixth gas flow path 230 of the outer cylinder 210) in the large injector 200 is greater than the pressure-receiving area of the valve element 355 (substantially equal to the sectional area of a sixth gas flow path 330 of an outer cylinder 310). In the valve closed position, the large injector accordingly has the greater force applied to the valve element by the pressure difference between the upstream side and the downstream side. Opening the injector requires the valve-opening force exceeding this pressure difference, so that the large injector 200 has the less maximum valve-openable pressure than the small injector 300. In the description of the embodiment, the maximum valve-openable pressure means the maximum value (upper limit) of the upstream pressure to open the valve of the injector.

Figure 6:
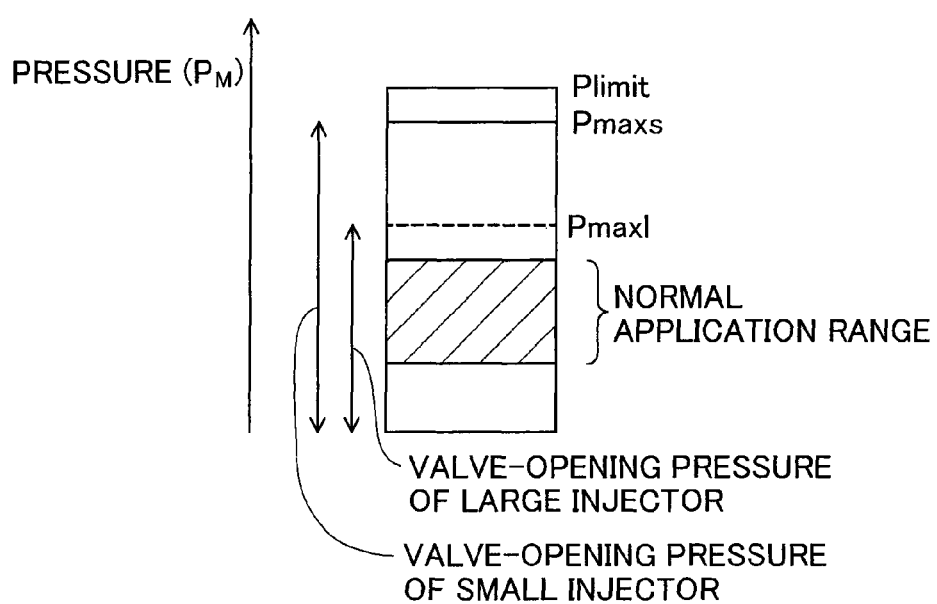
FIG. 6 illustrates the valve-opening characteristics of the injectors.

FIG. 6 illustrates the valve-opening characteristics of the injectors. The ordinate shows pressure $P_M$ in the upstream of the injectors 200 and 300 (hereinafter referred to as "upstream pressure $P_M$"). The large injector 200 can be opened at the pressure of or below a maximum valve-openable pressure Pmax1, while the small injector 300 can be opened at the pressure of or below a maximum valve-openable pressure Pmaxs, wherein Pmaxs>Pmax1. According to this embodiment, the maximum valve-openable pressure Pmaxs of the small injector 300 is less than the relief valve pressure Plimit for opening the relief valve 145 (FIG. 1). Alternatively the maximum valve-openable pressure Pmaxs of the small injector 300 may be set to be greater than the relief valve pressure Plimit. The upstream pressure $P_M$ applied during normal operation of the fuel cell vehicle 10 is in a range (hatched area) less than the maximum valve-openable pressure Pmax1 of the large injector 200.

Figure 7:
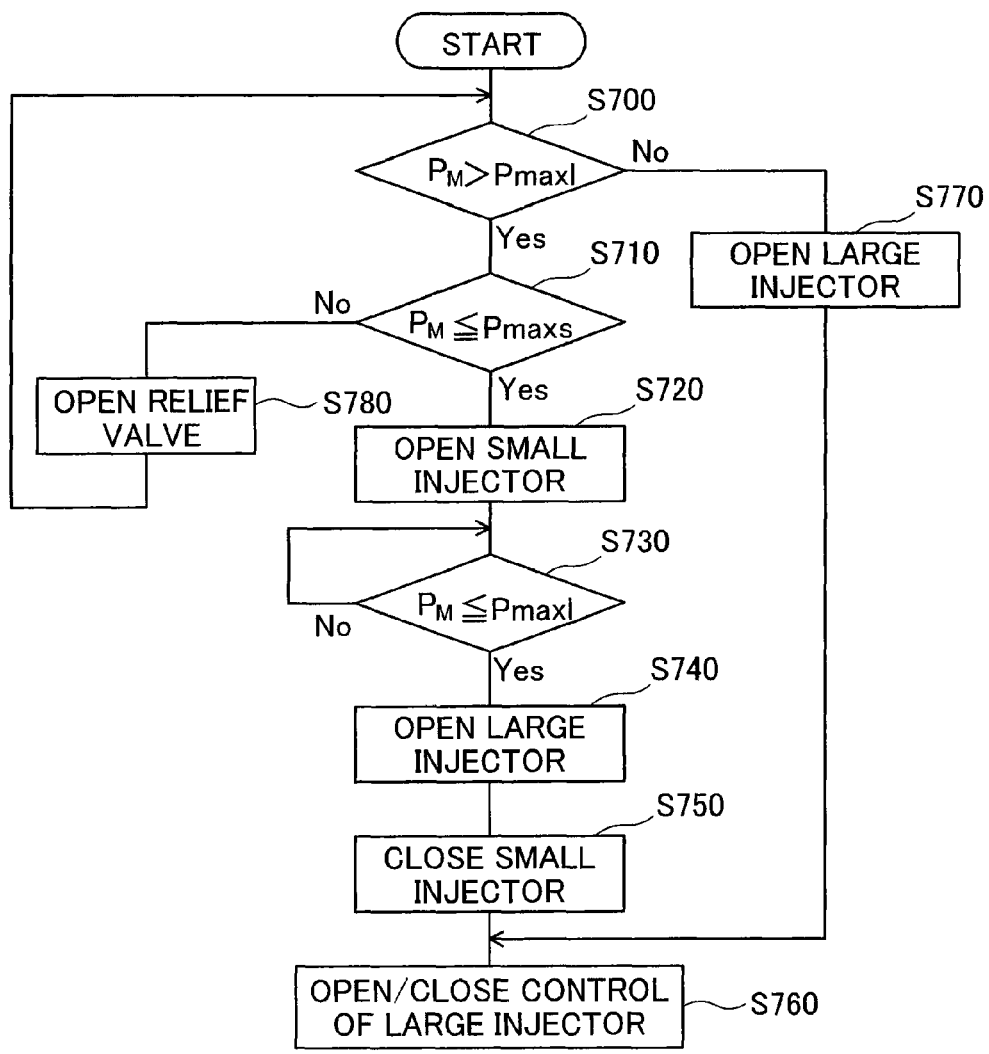
FIG. 7 is an operation flowchart at the start of the fuel cell vehicle (fuel cell system).

FIG. 7 is an operation flowchart at the start of the fuel cell vehicle (fuel cell system). Before the start, both the large injector 200 and the small injector 300 are in the valve closed position. At step S700, the controller 500 determines whether the upstream pressure $P_M$ is greater than the maximum valve-openable pressure Pmax1 of the large injector. When the upstream pressure $P_M$ is greater than the maximum valve-openable pressure Pmax1 of the large injector 200, the controller 500 subsequently determines whether the upstream pressure $P_M$ is equal to or less than the maximum valve-openable pressure Pmaxs_of the small injector 300 at step S710. When the upstream pressure $P_M$ is equal to or less than the maximum valve-openable pressure Pmaxs of the small injector 300, the controller 500 opens the small injector 300 at step S720. At this moment, the large injector 200 is kept in the closed position.

At step S730, the controller 500 determines whether the upstream pressure $P_M$ is dropped to or below the maximum valve-openable pressure Pmax1 of the large injector 200. When the upstream pressure $P_M$ is dropped to or below the maximum valve-openable pressure Pmax1_of the large injector 200, the controller 500 opens the large injector 200 at step S740. The controller 500 subsequently closes the small injector 300 at step S750. The controller 500 then performs open/close control of the large injector 200 at step S760, in order to regulate the amount of fuel gas supplied to the fuel cell stack 400.

When the upstream pressure $P_M$ is not greater than the maximum valve-openable pressure Pmax1 of the large injector at step S700, on the other hand, the controller 500 goes to step S770 to open the large injector 200. In this case, since the large injector 200 is opened, there is no need to open the small injector 300. This reduces the frequency of operation of the small injector 300. The small injector 300 has the metal valve element 355 and accordingly has the greater possibility of abrasion-induced deterioration than the large injector 200. The control based on the flow of FIG. 7 reduces the frequency of operation of the small injector 300. This prevents early deterioration of the small injector 300 and thereby improves the durability of the fuel cell system.

When the upstream pressure $P_M$ is greater than the maximum valve-openable pressure Pmaxs of the small injector 300 at step S710, the controller 500 goes to step S780 to open the relief valve 145 and thereby decrease the upstream pressure $P_M$. Decreasing the upstream pressure $P_M$ is required in order to open the small injector 300. When a mechanical relief valve is employed as the relief valve 145, the controller 500 cannot control the valve-opening of the relief valve. In the application of such a mechanical relief valve, the small injector 300 and the relief valve 145 are preferably selected, such that the maximum valve-openable pressure Pmaxs of the small injector 300 is greater than the relief valve pressure Plimit. In this application, the relief valve 145 is opened to decrease the upstream pressure $P_M$, before the upstream pressure $P_M$ reaches the maximum valve-openable pressure Pmaxs of the small injector 300. This allows the small injector 300 to be opened.

Figure 8:
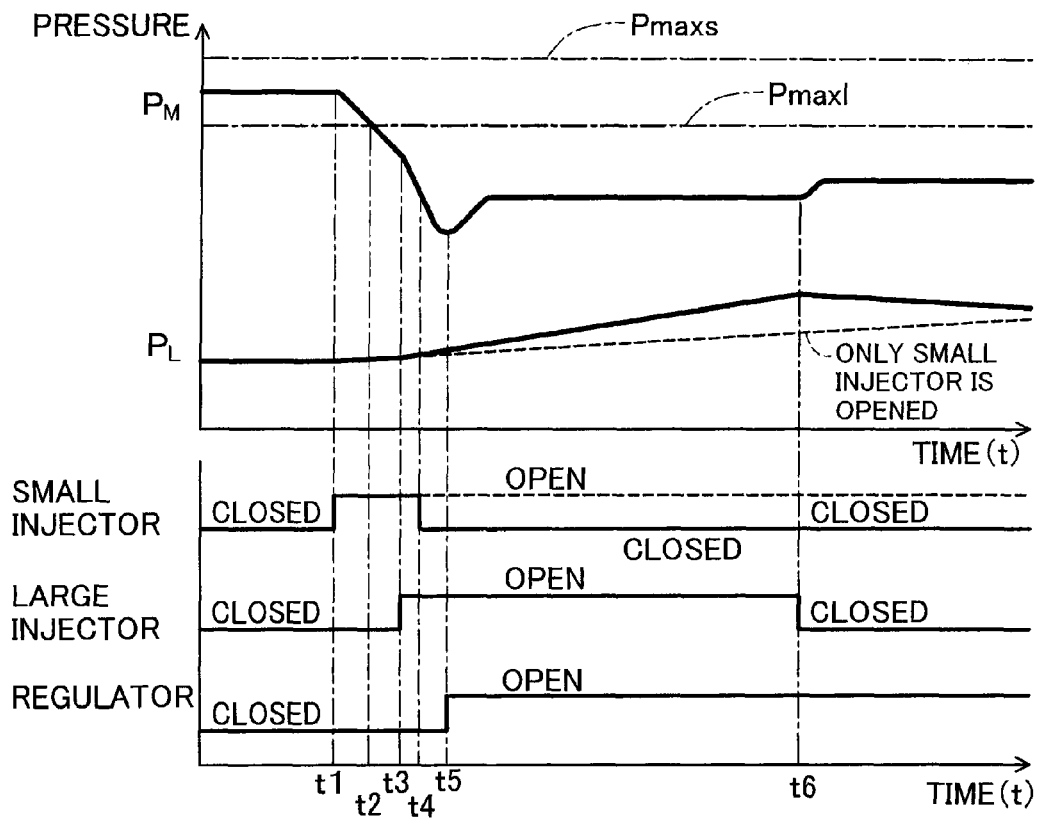
FIG. 8 illustrates one example of the variations in pressures of the gas flow paths and the open/close operations of the injectors at the start of the fuel cell system.

FIG. 8 illustrates one example of the variations in pressures of the gas flow paths and the open/close operations of the injectors at the start of the fuel cell system. It is here assumed that the upstream pressure $P_M$ is greater than the maximum valve-openable pressure Pmax1 of the large injector 200 at the start of the fuel cell vehicle 10 (fuel cell system). After the start of the fuel cell vehicle 10, at time t1, the controller 500 (FIG. 1) opens the small injector 300 (step S720 in FIG. 7). The fuel gas in the upstream of the injectors 200 and 300 goes through the small injector 300 and flows downstream. The upstream pressure $P_M$ is accordingly dropped, while pressure $P_L$ in the downstream of the injectors 200 and 300 (hereinafter referred to as "downstream pressure $P_L$") increases. In the downstream of the injectors 200 and 300, however, the fuel gas is consumed by the fuel cell stack 400 (FIG. 1), so that the downstream pressure $P_L$ increases at a lower rate than the decrease rate of the upstream pressure $P_M$.

At time t2, the upstream pressure PM is dropped to or below the maximum valve-openable pressure Pmax1 of the large injector 200. After time t2, the controller 500 can thus open the large injector 200. According to this embodiment, the controller 500 opens the large injector 200 at time t3 later than time t2.

In the valve open position of the large injector 200, the fuel gas goes through the large injector 200 in addition to the small injector 300 and flows downstream. The amount of fuel gas going through the large injector 200 is greater than the amount of fuel gas going through the small injector 300. The upstream pressure $P_M$ accordingly decreases at the higher rate than the decrease rate until time t3, while the downstream pressure $P_L$ increases at the higher rate than the increase rate until time t3.

At time t4, the small injector 300 is closed at step S750 in the flow of FIG. 7, after the large injector 200 is opened. At this moment, the amount of fuel gas going through the large injector 200 is greater than the amount of fuel gas going through the small injector 300. Valve-closing of the small injector 300 accordingly does not significantly change the amount of fuel gas flowing from the upstream side to the downstream side of the injectors 200 and 300. In the valve closed position of the small injector 300, no energy is required for valve-opening of the small injector 300. This accordingly achieves energy saving.

At time t5, the controller 500 opens the regulator 130 (FIG. 1). This supplies the fuel gas to upstream of the injectors 200 and 300, so that the upstream pressure $P_M$ increases and is then kept almost constant.

At time t6, the controller 500 closes the large injector 200. This stops the flow of fuel gas to downstream of the injectors 200 and 300, so as to increase the upstream pressure $P_M$. The fuel gas is consumed by the fuel cell stack 400, so that the downstream pressure $P_L$ is dropped. After this moment, the controller 500 performs open/close control of the large injector 200, so as to regulate the amount of fuel gas supplied to the fuel cell stack 400.

According to this embodiment, when the controller 500 does not open the large injector 200 but opens only the small injector 300, the downstream pressure $P_L$ increases only at the low rate, due to the small amount of fuel gas going through the small injector 300. In order to sufficiently increase the downstream pressure $P_L$, the controller 500 is required to keep the small injector 300 in the valve open position for a long period of time. This undesirably increases the energy consumption. It is thus preferable that the controller 500 opens the large injector 200 and closes the small injector 300 immediately after valve-opening of the small injector 300 decreases the upstream pressure $P_M$ to or below the maximum valve-openable pressure Pmax1 of the large injector 200.

When the controller 500 does not open the large injector 200 but opens only the small injector 300, the distribution of fuel gas in the fuel cell stack 400 (FIG. 1) may have a concentration variation (unevenness), due to the small amount of fuel gas going through the small injector 300. This concentration variation forms a concentration cell, which may degrade a catalyst (not shown) in the fuel cell stack 400. According to this embodiment, however, immediately after the upstream pressure $P_M$ decreases to or below the maximum valve-openable pressure Pmax1 of the large injector 200, the controller 500 opens the large injector 200 to supply the fuel gas to the fuel cell stack 400. Such control effectively avoids a concentration variation from occurring in the distribution of fuel gas in the fuel cell stack 400 and thereby prevents formation of a concentration cell. This advantageously prevents degradation of the catalyst and improves the durability of the fuel cell system.

Figure 9:
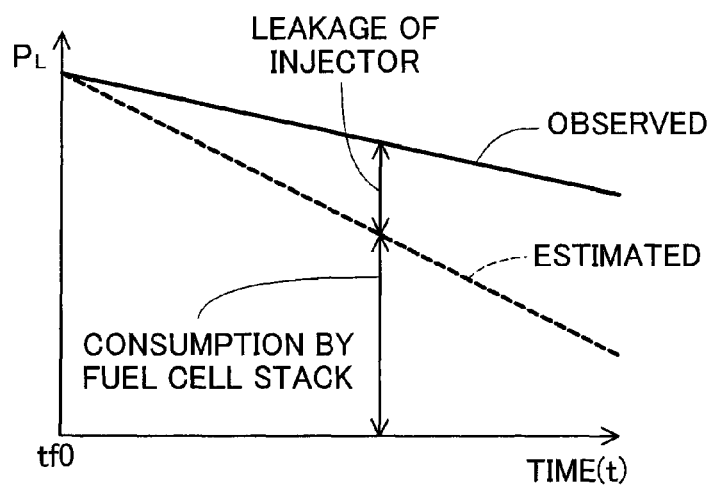
FIG. 9 shows a variation in pressure of the gas flow path in the downstream of the injector at a stop of the fuel cell system.

*Modification 1:

FIG. 9 shows a variation in pressure of the gas flow path in the downstream of the injector at a stop of the fuel cell system. At the stop of the fuel cell system, the controller 500 closes the injectors 200 and 300. The fuel gas in the downstream of the injectors 200 and 300 is consumed by the electrochemical reaction in the fuel cell stack 400, so that the downstream pressure $P_L$ is gradually dropped. When there is any leakage in the injector 200 or 300, however, the downstream pressure $P_L$ hardly decreases. The controller 500 may thus monitor the downstream pressure $P_L$ (decrease rate of the downstream pressure $P_L$) to detect the presence or the absence of any leakage in the injector 200 or 300.

The injector with a metal valve element generally has the slightly poorer reproducibility for sealing, thereby having the greater possibility of leakage amount change, compared with the injector with a rubber sealing element. This is because of the following reason. In the injector with the rubber sealing element, the rubber sealing element is adhered to the valve seat, so that there is little possibility of leakage. In the injector with the metal valve element, on the other hand, the valve element is not adhered to the valve seat, so that there may be a variation in amount of leakage by the contact of the valve element with the valve seat. In the injector with the metal valve element, even when there is leakage of or over a certain level in the valve closed position, valve-opening and subsequent valve-closing operations may reduce the amount of leakage.

A variation $\Delta P_L$ of the downstream pressure $P_L$ may be expressed by the following equation:

$\Delta P_L$=(Amount of Valve Leakage in Injector−Consumption by Fuel Cell Stack)/(Volume of Downstream Section)

When there is a large pressure change rate $\Delta P_L/\Delta t$ (variation per unit time), the controller 500 can detect the presence of a leakage in the injector. As explained above, the injector with the metal valve element has the greater possibility of leakage than the injector with the rubber sealing element. In response to detection of a leakage, the controller 500 may thus determine that the small injector 300 has a leakage.

FIG. 10 illustrates one example of a variation in amount of leakage by the open/close operations of the small injector. The abscissa of FIG. 10 shows the ordinal number of open/close operation of the small injector 300, and the ordinate shows the amount of leakage after each open/close operation. In the illustrated example of FIG. 10, the amount of leakage does not exceed a reference level (allowable level) after the first to the fourth operations. After the fifth operation, however, the amount of leakage significantly increases and exceeds the reference level. The subsequent valve open/close operations of the small injector 300 decrease the amount of leakage, and the amount of leakage does not exceed the reference level after the sixth to the eighth operations. In the small injector 300 having the metal valve element 355 (FIG. 4), even once the amount of leakage exceeds the reference value, the subsequent open/close operations may decrease the amount of leakage. The controller 500 may monitor the downstream pressure $P_L$ (decrease rate of the downstream pressure $P_L$) after the stop of the fuel cell system, so as to estimate the amount of leakage in the small injector 300. When there is a large amount of leakage, the subsequent open/close operations of the small injector 300 may decrease the amount of leakage.

The controller 500 may perform learning of the decrease rate of the downstream pressure $P_L$ to change the reference level as the criterion for determining whether the subsequent open/close operation of the small injector 300 is required. As shown in FIG. 9, a leakage of the small injector 300 is obtainable by subtracting the actually observed decrease rate of the downstream pressure $P_L$ from the estimated decrease rate of the downstream pressure $P_L$ calculated from the consumption by the fuel cell stack. The controller 500 may perform learning of an amount of leakage $L_K$ (mol/s) per unit time of the small injector 300 to estimate an amount of leakage $L_M$ (mol/s) per unit time of the main stop valve 120 from a variation $\Delta P_M$ of the upstream pressure $P_M$ and a volume $V_M$ of the upstream gas supply pipe 110 according to the following equation:

$L_M = (\Delta P_M \times V_M)/(R \cdot T) + L_K$ where R represents the gas constant and T represents the temperature.

Figure 11A:
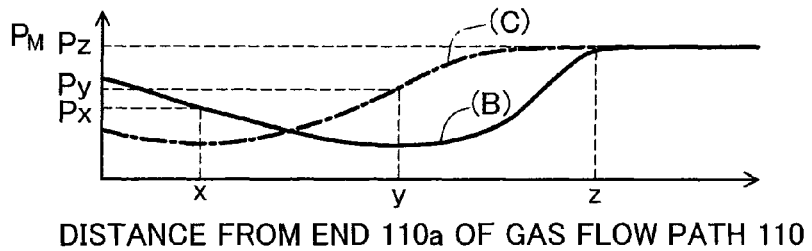
FIGS. 11A-11C illustrate variations of the upstream pressure $P_M$ in the upstream of the injectors at the valve-opening time of the small_injector relative to the positions of the injectors on the gas flow path.
Figure 11B:
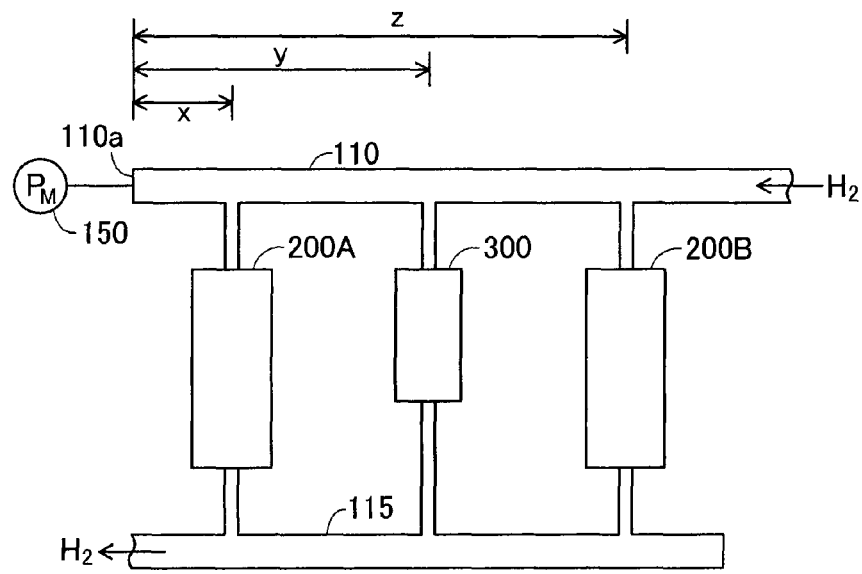
Figure 11C:
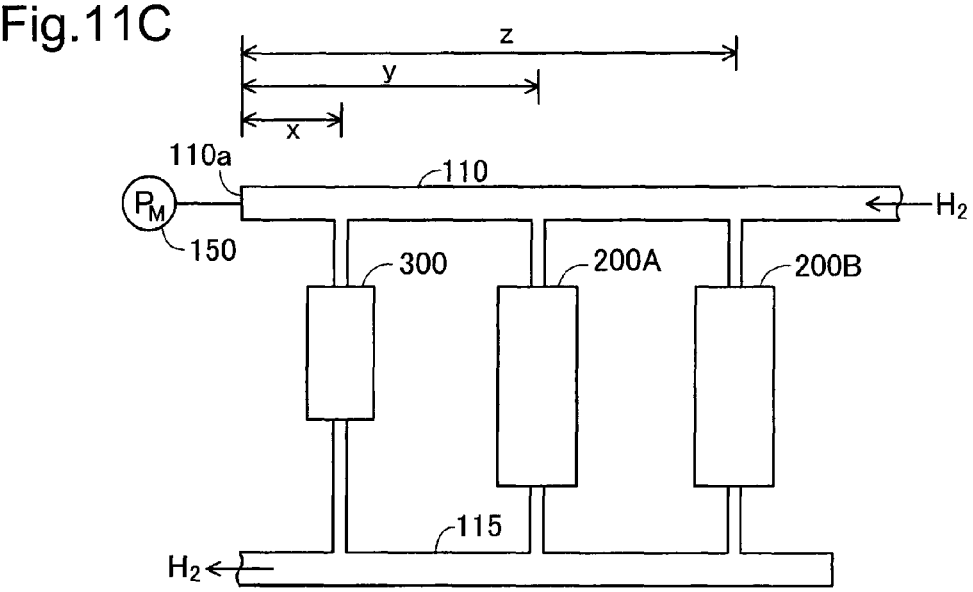

*Modification 2:

FIGS. 11A-11C illustrate variations of the upstream pressure $P_M$ in the upstream of the injectors at the valve-opening time of the small injector relative to the positions of the injectors on the gas flow path. The structure of this modification has two large injectors 200A and 200B and one small injector 300. In the illustrated example of FIG. 11B, the large injector 200A, the small injector 300 and the other large injector 200B are provided in this order from the downstream side of the upstream gas supply pipe 110. In the illustrated example of FIG. 11C, the small injector 300, the large injector 200A and the other large injector 200B are provided in this order from the downstream side of the upstream gas supply pipe 110. FIG. 11A shows the pressure distributions in the upstream gas supply pipe 110 at the timings after the valve-opening of the small injector 300 in the arrangement of FIG. 11B and in the arrangement of FIG. 11C.

As described previously with reference to FIG. 7, when the upstream pressure $P_M$ is greater than the maximum valve-openable pressure Pmax1 of the large injector, the small injector 300 is opened first. This decreases the pressure in the joint section of the upstream gas supply pipe 110 connected with the small injector 300. In the illustrated example of FIG. 11B, the small injector 300 is located at a position apart by a distance y from an end 110a of the upstream gas supply pipe 110 (hereinafter referred to as "position y"). A shown by the solid-line curve of FIG. 11A, the pressure reaches its minimum at the position y. In the illustrated example of FIG. 11C, on the other hand, the small injector 300 is located at a position apart by a distance x (x<y) from the end 110a of the upstream gas supply pipe 110 (hereinafter referred to as "position x"). As shown by the chain-line curve of FIG. 11A, the pressure reaches its minimum at the position x.

The following discusses the pressure in the joint sections connected with the two large injectors 200A and 200B. In the illustrated example of FIG. 11B, the large injector 200A is located at the position apart by the distance x from the end 110a of the upstream gas supply pipe 110, and the large injection 200B is located at a position apart by a distance z (x<y<z) from the end 110a of the upstream gas supply pipe 110 (hereinafter referred to as "position z"). In this state, pressure Px at the position x of the upstream gas supply pipe 110 is less than pressure Pz at the position z of the upstream gas supply pipe 110. This is because the fuel gas flowing through the upstream gas supply pipe 110 is supplied to the position z in the upstream gas supply pipe 110, while the downstream of the position x in the upstream gas supply pipe 110 is closed and accordingly has little supply of the fuel gas. Similarly, in the illustrated example of FIG. 11C, pressure Py at the position y in the upstream gas supply pipe 110 is smaller than pressure Pz at the position z in the upstream gas supply pipe 110.

The following discusses the comparison between the pressure Px in FIG. 11B and the pressure Py in FIG. 11C. The pressure Px at the position x of FIG. 11B is less than the pressure Py at the position y of FIG. 11C, because of the following reason. In the illustrated example of FIG. 11B, the fuel gas supplied from the upstream side is flowed to the downstream gas flow path by the small injector 300, so that the downstream of the position y in the upstream gas supply pipe 110 has little supply of the fuel gas. The pressure Px is thus not significantly increased. In the illustrated example of FIG. 11C, on the other hand, the fuel gas supplied from the upstream side is flowed first to the position y in the upstream gas supply pipe 110 and is then to the downstream position x in the upstream gas supply pipe 110. The pressure is thus not significantly dropped at the position y in the upstream gas supply pipe 110.

As described above, locating the large injector 200A in the downstream of the small injector 300 enables the pressure to be promptly dropped at the joint section of the upstream gas supply pipe 110 connected with the large injector 200A. Such prompt pressure drop leads to valve-opening of the large injector 200A at the earlier timing and valve-closing of the small injector 300 at the earlier timing. This reduces the energy consumed by the small injector 300 and achieves energy saving, while preventing formation of a concentration cell.

As clearly understood from the graph of FIG. 11A, the pressure within the upstream gas supply pipe 110 increases with the distance from the small injector 300. In the structure with the two large injectors 200, one large injector 200 located closer to the small injector 300 may be opened prior to the other injector 200 located farther from the small injector 300.

In the structure of the embodiment, the upstream pressure gauge 150 is located in the vicinity of the large injector 200A, which is to be opened first. The controller 500 can thus obtain the upstream pressure in the vicinity of the large injector 200A and thus readily determine the valve-open timing of the large injector 200A.

The embodiment described above uses the small injector 300 having the metal valve element 355 but, the small injector may be provided with a rubber sealing element, like the large injector 200. The rubber sealing element will be adhered to the valve seat 315 and more effectively prevents a leakage of the small injector 300. The metal valve element 355, on the other hand, does not have rubber squeeze and accordingly allows the greater flow rate relative to the stroke.

The foregoing has described the invention in detail with reference to some embodiments. The embodiments of the invention described above are only illustrative for the purpose of better understanding of the invention, and the invention is not limited to these embodiments in any sense. Various variants and modifications may be made to the embodiments without departing from the spirit and the scope of the invention. The invention includes such variants, modifications and equivalents.

DESCRIPTION OF MARK 10 fuel cell vehicle
100 fuel tank
110 upstream gas supply pipe
110a end
115 downstream gas supply pipe
120 main stop valve
130 regulator
140 branch pipe
145 relief valve
150 upstream pressure gauge
160 downstream pressure gauge
200,200A,200B large injector
201 central axis
210 outer cylinder
215 valve seat
220 first gas flow path
225 fifth gas flow path
230 sixth gas flow path
250 plunger
255 valve element
260 sealing element
265 third gas flow path
270 second gas flow path
275 fourth gas flow path
280 stationary iron core
290 solenoid
295 spring
300 small injector
310 outer cylinder
330 sixth gas flow path
355 valve element
365 third gas flow path
390 solenoid
400 fuel cell stack
500 controller

The invention claimed is:

1. A gas supply device for use in a fuel cell system, comprising:
    a plurality of first-type injectors configured to have a first maximum valve-openable pressure;
    a second-type injector arranged in parallel with the first-type injectors and configured to have a lower flow rate than the first-type injectors and a greater second maximum valve-openable pressure than the first maximum valve-openable pressure;
    wherein one of the first-type injectors is located nearest to the second-type injector than the other of the first-type injectors;
    a first pressure sensor located upstream of the first-type and second-type injectors; and
    a controller configured to control open/close operation of the first-type and second-type injectors, wherein
    at a start of the fuel cell system,
    (i) when pressure in the upstream of the first-type and second-type injectors is greater than the first maximum valve-openable pressure but is less than or equal to the second maximum valve-openable pressure, the controller opens the second-type injector, and when the pressure in the upstream of the first-type and second-type injectors is dropped to or below the first maximum valve-openable pressure after opening of the second-type injector, the controller first opens the first-type injector that is nearest to the second-type injector, and
    (ii) when the pressure in the upstream of the first-type and second-type injectors is less than or equal to the first maximum valve-openable pressure, the controller opens the first-type injectors.

2. The gas supply device according to claim 1, wherein the controller closes the second-type injector after the opening of the first-type injectors.

3. The gas supply device according to claim 1, wherein the second-type injector has:
    a valve seat; and
    a metal valve element.

4. The gas supply device according to claim 3, further comprising:
    a second pressure sensor located downstream of the first-type and second-type injectors, wherein
    after stop of operation of the fuel cell system, when a decrease rate of the pressure in the downstream of the first-type and second-type injectors is lower than a predetermined reference level, the controller opens the second-type injector and subsequently closes the second-type injector.

5. The gas supply device according to claim 1, wherein when two or more first-type injectors are located nearest to the second-type injector, the controller first opens one of the two or more first-type injectors that is located on the most downstream side.

6. The gas supply device according to claim 5, wherein the first pressure sensor is located at such a position that a distance between the first pressure sensor and the first-type injector opened first is shorter between a distance between the first pressure sensor and other non-opened first-type injector.

* * * * *